US006942776B2

(12) United States Patent
Medoro

(10) Patent No.: US 6,942,776 B2
(45) Date of Patent: Sep. 13, 2005

(54) METHOD AND APPARATUS FOR THE MANIPULATION OF PARTICLES BY MEANS OF DIELECTROPHORESIS

(75) Inventor: Gianni Medoro, Trinitapoli (IT)

(73) Assignee: Silicon Biosystems S.R.L., Bologna (IT)

( * ) Notice: Subject to any disclaimer, the term of this patent is extended or adjusted under 35 U.S.C. 154(b) by 0 days.

(21) Appl. No.: 10/126,014

(22) Filed: Apr. 18, 2002

(65) Prior Publication Data

US 2003/0047456 A1 Mar. 13, 2003

Related U.S. Application Data

(63) Continuation-in-part of application No. 09/990,898, filed on Nov. 16, 2001, now abandoned.

(30) Foreign Application Priority Data

May 18, 1999 (IT) ........................................ BO99A0262
May 13, 2000 (WO) ................................ PCT/IB00/00641

(51) Int. Cl.$^7$ ......................... C02F 1/469; B01D 57/02; B01D 59/42; B01D 59/50; B01D 61/42
(52) U.S. Cl. ........................................ 204/547; 204/643
(58) Field of Search ................................. 204/547, 643, 204/600, 454

(56) References Cited

U.S. PATENT DOCUMENTS 4,418,346 A * 11/1983 Batchelder .................. 345/107
5,795,457 A * 8/1998 Pethig et al. ............... 204/547
5,837,115 A * 11/1998 Austin et al. ............... 204/450
5,993,631 A * 11/1999 Parton et al. ............... 204/547
5,993,632 A * 11/1999 Becker et al. .............. 204/547
6,027,623 A * 2/2000 Ohkawa ..................... 204/450
6,090,617 A * 7/2000 Meserol .................... 435/285.2
6,113,768 A * 9/2000 Fuhr et al. .................. 204/643
6,149,789 A * 11/2000 Benecke et al. ............ 204/547
6,251,691 B1 * 6/2001 Seul ........................... 436/534
6,264,815 B1 * 7/2001 Pethig et al. ............... 204/547
6,294,063 B1 * 9/2001 Becker et al. ............. 204/450
6,387,707 B1 * 5/2002 Seul et al. .................. 436/164
6,426,615 B1 * 7/2002 Mehta ....................... 324/71.4

OTHER PUBLICATIONS

Herbert A. Pohl, "DIELECTROPHORESIS", 1978 (Table of Contents, pp. 6–7 titled "Theoretical aspects").

* cited by examiner

*Primary Examiner*—J. A. Lorengo
*Assistant Examiner*—Jennine Brown
(74) *Attorney, Agent, or Firm*—Robert J. Rose; Sheldon & Mak PC

(57) ABSTRACT

An apparatus and method for establishing closed dielectrophoretic potential cages and precise displacement thereof comprising a first array of selectively addressable electrodes, lying on a substantially planar substrate and facing toward a second array comprising one electrode. The arrays define the upper and lower bounds of a microchamber where particles are placed in liquid suspension. By applying in-phase and counter-phase periodic signals to electrodes, one or more independent potential cages are established which cause particles to be attracted to or repelled from cages according to signal frequency and the dielectric characteristics of the particles and suspending medium. By properly applying voltage signal patterns into arrays, cages may trap one or more particles, thus permitting them to levitate steadily and/or move. In the preferred embodiment, where one array is integrated on a semiconductor substrate, displacement of particles can be monitored by embedded sensors.

30 Claims, 12 Drawing Sheets

METHOD AND APPARATUS FOR THE MANIPULATION OF PARTICLES BY MEANS OF DIELECTROPHORESIS

CROSS-REFERENCE TO RELATED APPLICATION

This application is a Continuation-in-Part of U.S. patent application Ser. No. 09/990,898 filed Nov. 16, 2001, now abandoned and titled "Method And Apparatus For The Manipulation Of Particles By Means Of Dielectrophoresis;" that claims priority from Application PCT/IB00/00641 filed May 13, 2000 and titled "Method And Apparatus For The Manipulation of Particles by Means of Dielectrophoresis," and claims benefit of Italian patent application B099A000262, filed May 18, 1999; the contents of which are incorporated by reference herein in their entirety.

FIELD OF THE INVENTION

An apparatus and method are disclosed for the manipulation and detection of particles such as cells, polystyrene beads, bubbles, and organelles by means of dielectrophoretic forces.

BACKGROUND OF THE INVENTION

Dielectrophoresis (DEP) relates to the physical phenomenon whereby neutral particles, when subject to nonuniform, time stationary (DC) or time varying (AC) electric fields, experience a net force directed towards locations with increasing (pDEP) or decreasing (nDEP) field intensity. If the intensity of the said dielectrophoretic force is comparable to the gravitational one, an equilibrium may be established in order to levitate small particles. The intensity of the dielectrophoretic force, as well as its direction, strongly depend on the dielectric and conductive properties of particles and on the medium in which the body is immersed. In turn, these properties may vary as a function of frequency for AC fields.

A description of the theory of dielectrophoresis has been published by H. A. Pohl in "Dielectrophoresis" Cambridge University Press (Cambridge 1978). A theoretical formulation of a case of particular interest is reported in Biochimica et Biophysica Acta 1243 (1995) p. 185–194, and Journal of Physics, D; Applied Physics, 27 (1994) pp. 1571–1574.

Studies on the action of dielectrophoresis on both biological matter (cells, bacteria, viruses DNA, etc.) and inorganic matter particles have lately proposed using DEP forces for the isolation of elements from a mixture of microorganisms, their characterization by differences in physical properties and their general manipulation. For such purposes, the suggestion has been to utilize systems of the same scale of particle size, in order to reduce the potentials required by electrical field distributions.

U.S. Pat. Nos. 5,888,370, 4,305,797, 5,454,472, 4,326,934, 5,489,506, 5,589,047, 5,814,200, teach different methods of separating particles in a sample, based on differences in dielectric and conductive properties characterizing the species they belong to. The main drawback, common to all devices proposed resides in the requirement of mechanical and fluid dynamic microsystems for moving fluids within the system. Moreover, each apparatus of the above listed patents involves contact and friction of particles with the surfaces of the system, compromising their mobility and integrity.

U.S. Pat. No. 5,344,535 teaches a system for the characterization of microorganism properties. The disclosed apparatus and the proposed method have the shortcoming of providing data on a large number of bodies, lacking the advantages of analysis on a single particle. In addition, the disclosed system is unable to prevent contact of particles with device surfaces.

U.S. Pat. No. 4,956,065 teaches an apparatus to levitate single particles and analyze their physical properties. However, this device requires a feedback control system since it employs pDEP. Moreover, the system is unsuitable for miniaturization, having a three-dimensional topology which is not compatible with mainstream microelectronic fabrication technologies.

The paper by T. Schnelle, R. Hagedorn, G. Fuhr, S. Fiedler, T. Muller in "Biochimica et Biophysica Acta", 1157(1993) pp. 127–140, describes research and experiments on the creation of three-dimensional potential cages for the manipulation of particles. However, the proposed structures are very difficult to fabricate in scale with the size of cells (required for trapping a single cell in the cage). In fact, the major problem of these systems is the vertical alignment of two structures on a micro-metric scale.

SUMMARY OF THE INVENTION

The present invention relates to a method for the stable levitation and independent motion of neutral particles in a liquid suspending medium and their precise displacement by means of an electronically programmable device adapted to receive such a solution.

As used above, the term "particle" is intended to include biological matter such as cells, cell aggregates, cell organelles, bacteria, viruses and nucleic acids as well as inorganic matter such as minerals, crystals, synthetic particles and gas bubbles. By "dielectrophoretic potential" what is meant is a three-dimensional (3D) scalar function whose gradient is equal to the dielectrophoretic force. By "equipotential surface" what is meant is a surface defined in the 3D space whose points have the same dielectrophoretic potential; the dielectrophoretic force is always perpendicular to said surface. By "potential cage" what is meant is a portion of space enclosed by an equipotential surface and containing a local minimum of the dielectrophoretic potential. By "particle trapped inside a potential cage" what is meant is a particle subject to dielectrophoretic force and located inside the said cage. At equilibrium, if the particle is subject to dielectrophoretic force only, then it will be located at a position corresponding to the said dielectrophoretic potential minimum, otherwise it will be positioned at a displacement from that minimum given by the balance of forces.

The preferred, but not exclusive, embodiment of the present invention, comprises two main opposed modules; the first one comprises a plurality of electrically conductive electrodes, whose shape may be of various types, regularly arranged on a insulating substrate; the electrodes may be optionally coated with an insulating layer protecting them from charge carriers present in the liquid suspension. If this module is realized with integrated circuit fabrication technology, it may include memory elements for electrode programming, configurable signal generators such as sine or square wave, impulse etc., with variable frequency and phase, any integrable sensor device for detecting the presence of the particle, input/output circuits etc. The second module comprises a single large electrode fabricated in a conductive, optionally transparent matter, which in turn may be coated with an insulating layer. It is to be understood that this large electrode may also be split into several electrodes, if desired. A spacer can be inserted between the first (lower) module and the second. (upper) one in order to implement a chamber for the containment of the sample to be analyzed or manipulated. The same spacer may also serve to establish separation walls inside the device so as to realize multiple chambers. Of course, the spacer may also be integrated in either the first or second module, or both. Finally, a visual inspection system such as a microscope and camera may be added to the device, as well as fluidics systems for moving liquid or semi-liquid matter in and out of the device.

The architecture of the apparatus described allows one, by simply applying in-phase and counter-phase periodic signals to the electrodes, to establish in the micro-chamber one or more independent potential cages, the strength of which may be varied by acting on the frequency as well as on the amplitude of the signals applied. The cages may trap one or more particles, thus permitting them either to levitate steadily or to move within the micro-chamber, or both. Due to this feature, any contact or friction of the particles with the chamber borders and the electrodes can be avoided. The height and relative displacement of cages can be independently set by an appropriate choice of signals and does not require any mechanical adjustment. Thus, the device can be configured as a fully programmable electronic apparatus.

The methodology for the displacement of the potential cage along the micro-chamber is much like the principle used in charge coupled devices (CCDs). For example, if a first electrode is in-phase with the upper module and is surrounded by electrodes connected to counter-phase signals, a potential cage is established on top of it. Then, by simply applying in-phase signals to one of the adjacent electrodes (in the same direction as the programmed motion) the potential cage spreads over the two electrodes thus aligning its center in between them: the particle has thus moved half of the cell-pitch. Once the transient has expired the phase is reversed for the first electrode (where the particle was located at the beginning of the phase): this causes the potential cage to shrink and to move on top of the in-phase electrode which is displaced one cell-pitch away from the previous electrode. By repeating the latter operation along other axis any potential cage may be moved around the array plane.

The shortcomings of devices known from the prior art can be overcome thanks to the apparatus according to the present invention, which allows one to establish a spatial distribution of electric fields that induce closed dielectrophoretic potential cages. The proposed device does not require precise alignment of the two main modules, thus optimizing both simplicity and production cost: it overcomes most of the restrictions related to the implementation cost and to the minimum allowable cage potential size inherent in the prior art (alignment gets more and more critical as the electrode size shrinks). Hence misalignment of the two main modules does not compromise the system functionality. The importance of this feature may be better appreciated if one thinks of all the applications in which the device is manually opened and/or closed, requiring repeated and flexible use; it may thus be implemented in low-cost, standard manufacturing microelectronic technology. Moreover, the proposed device easily allows trapped particles to be displaced along a wide range compared to the particle size.

In addition, no prior art system that employs fluidics or "traveling fields" for the displacement of particles achieves precise particle positioning while keeping particles away from device surfaces; yet, it is apparent that such a result can be achieved if three-dimensional potential-cages positioned at a fixed height and movable along other directions of the apparatus are available. Further advantages of the invention stem from the possibility to control the height of the cage potentials by adjusting the voltage values applied.

Thanks to the flexible programming of the disclosed invention, virtual paths can be established, thus avoiding the need for application-specific devices and widening the range of potential applications and users. Furthermore, the ability to integrate optical and/or capacitive sensing allows one to overcome the need for bulky detection instrumentation normally used in this field, such as microscopes and cameras, although it does not prevent it form being used for visual inspection of the internal micro-chamber. Processing the integrated sensors information with feedback control techniques, enables complex operations to be carried out in a fully automated way: for example, characterization of the physical properties of particles under test.

Finally, the closed potential cage approach prevents particles from getting out of control in the presence of: hydrodynamic flows due to thermal gradients, significant Brownian motions (equally likely from any direction), or forces due to Archimedes' balance. In fact, in all the above cases, any apparatus providing non-closed potential surfaces proves ineffective, since it cannot counterbalance upward forces.

Some unique features of the apparatus according to the present invention, as compared to those present in the prior art, may be summarized as:

1. the capability of establishing closed dielectrophoretic potential cages without requirements of alignment between modules, whereby single or groups of particles are independently trapped in the cages and placed in stable suspension by means of dielectrophoretic forces without any friction with electrodes or boundaries.
2. The ability to move any potential cage independently around the micro-chamber by virtue of electronically programmed electric signals.
3. The possibility of shrinking the cage size according to application requirements and implementation, thus permitting fabrication of the device in microelectronic technology with implementation of embedded sensors, actuators and signal generation.

DETAILED DESCRIPTION

Figure 1:
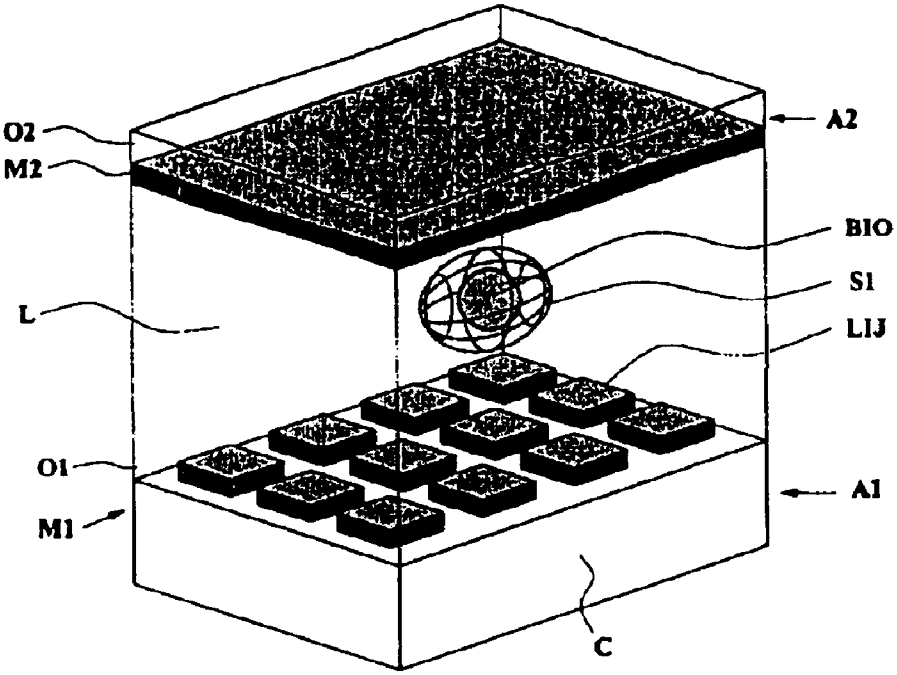
FIG. 1 shows a schematic three-dimensional view of a part of the device devoted to sample manipulation, with the modular structure formed by the substrate, including the electrodes, and the lid.

The features and advantages of the invention will be clearer from the description of embodiments illustrated by examples in what follows. It is to be understood that examples used herein are for purpose of describing a particular embodiment and arc not intended to be limiting of the spirit of the invention.

Dielectrophoretic Potential Energy

A dielectric sphere immersed in a liquid at coordinates (x, y, z), and subject to the effect of spatially non-uniform AC or DC electric fields, is subject to a dielectrophoretic force F(t) whose time-averaged value is described by the following:

$$\langle F(t)\rangle=2\pi\epsilon_0\epsilon_m r^3\{Re[f_{CM}]\nabla(E_{RMS})^2++Im[f_{CM}](E_{x0}{}^2\nabla\phi_x+E_{y0}{}^2\nabla\phi_y+E_{z0}{}^2\nabla\phi_z)\}. \quad (1)$$

where $\epsilon_0$ is the vacuum dielectric constant, r is the particle radius, $E_{RMS}$ is the root mean square value of the electric field, $E_{x0}$, $E_{y0}$, $E_{z0}$ are the electric field component along axes x, y, z, while $\phi_{x,y,z}$ are the phases of the electric field component and $f_{CM}$ is the well known Clausius-Mossotti factor defined as:

$$f_{CM}=\frac{\epsilon_p^*-\epsilon_m^*}{\epsilon_p^*+2\epsilon_m^*}$$

where $\epsilon^*_p$ and $\epsilon^*_m$ represent the relative complex permittivity of the particle and of the suspending medium respectively, defined as: $\epsilon^*_{m,p}=\epsilon_{m,p}-i\sigma/(\epsilon_0\omega)$, where $\epsilon$ is the relative dielectric constant, $\sigma$ is the conductivity, $\omega$ is the angular frequency and i is the square root of minus one.

If electric field phases are constant, equation (1) may be simplified to:

$$\langle F(t)\rangle=2\pi\epsilon_0\epsilon_m r^3 Re[f_{CM}]\nabla(E_{RMS})^2 \quad (2)$$

where nDEP is defined by $Re[f_{CM}]<0$ while pDEP is defined by $Re[f_{CM}]>0$. For high values of $\omega$, where $\epsilon^*_m$, $\epsilon^*_p\leftarrow\epsilon_m$, $\epsilon_p$ pDEP is established on a particle whenever $\epsilon_m<\epsilon_p$ whilst nDEP is established whenever $\epsilon_m>\epsilon_p$. Since $\epsilon^*_{m,p}=\epsilon^*_{m,p}(\omega)$, thus $f_{CM}=f_{CM}(\omega)$ so that $Re[f_{CM}]$ may have different signs for different species of particle at a given frequency. The method of choosing an angular frequency $\omega$ so that two different species of particles experience nDEP and pDEP respectively, is commonly used as known art for selection purposes.

Since the force described in equation (2) is conservative, it is possible to define the dielectrophoretic potential energy:

$$\langle W\rangle=-2\pi\epsilon_0\epsilon_m r^3 Re[f_{CM}]\langle E_{RMS}\rangle^2,$$

where, $$\langle F(t)\rangle=-\nabla\langle W\rangle,$$

If the voltage signals applied to electrodes and establishing the electric field are periodic, it can easily be shown that $$\langle W\rangle=-\alpha 2\pi\epsilon_0\epsilon_m r^3 Re[f_{CM}]E^2 \quad (3)$$

where $\alpha$ is a constant that depends on the shape of the voltage signals applied to electrodes and E is the magnitude of the electric field, (e.g. $\alpha=1$ for square-wave signals and $\alpha=1/\sqrt{2}$ for sinusoidal signals). Thus, minima of $E^2$ are also minima of the negative dielectrophoretic potential (since for nDEP, $Re[f_{CM}]<0$) as well as maxima of the positive dielectrophoretic potential (since for pDEP, $Re[f_{CM}]>0$). In what follows, "dielectrophoretic potential" will be used as a synonym of "negative dielectrophoretic potential". Furthermore, since $E^2$ is a monotonic function of E, the minima or maxima of E correspond to the minima or maxima of the dielectrophoretic potential function $\langle W\rangle$. This is very useful since the location of the dielectrophoretic potential minima or maxima can be found by time-stationary simulations of the electric field as illustrated by the figures enclosed. To summarize the above concept, it can be easily demonstrated that:

- any dielectrophoretic potential cage (containing nDEP potential energy local minima) is enclosed bay at least one imaginary closed surface composed of points of the space having constant electric field magnitude.

If the spherical and homogeneous particle is subject to the gravitational force:

$$F_g=\frac{4}{3}\pi R^3\Delta\rho g$$

where $\Delta\rho$ is the mass density difference between the particle and the medium and g is the acceleration of gravity (9.807 $m/s^2$), as well as to nDEP, then stable suspension is achieved according to:

$$\langle F(t)\rangle>F_g. \quad (4)$$

Since the relative dielectric constant cannot be greater than unity (e.g. if the particle is a bubble of air immersed in water, where $\epsilon_p=1$ and $\epsilon_m\approx81$), then the minimum value of $\nabla E_{rms}{}^2$ required for balancing the gravitational force acting on the particle can be estimated, by using equation (4), as $1.835\cdot10^3$ $(V/cm)^2/\mu m$ which is achievable by using standard microelectronic technology and/or micro-machining techniques. Again, particles that are twice as heavy than water ($\Delta\rho \simeq 1000$ Kg/m$^3$) can be suspended in water, if the relative dielectric constant of the medium is at least 2.2÷20.3 times greater than that of the particle for typical values of $\nabla E_{rms}^2$.

General Structure of the Device

Figure 2:
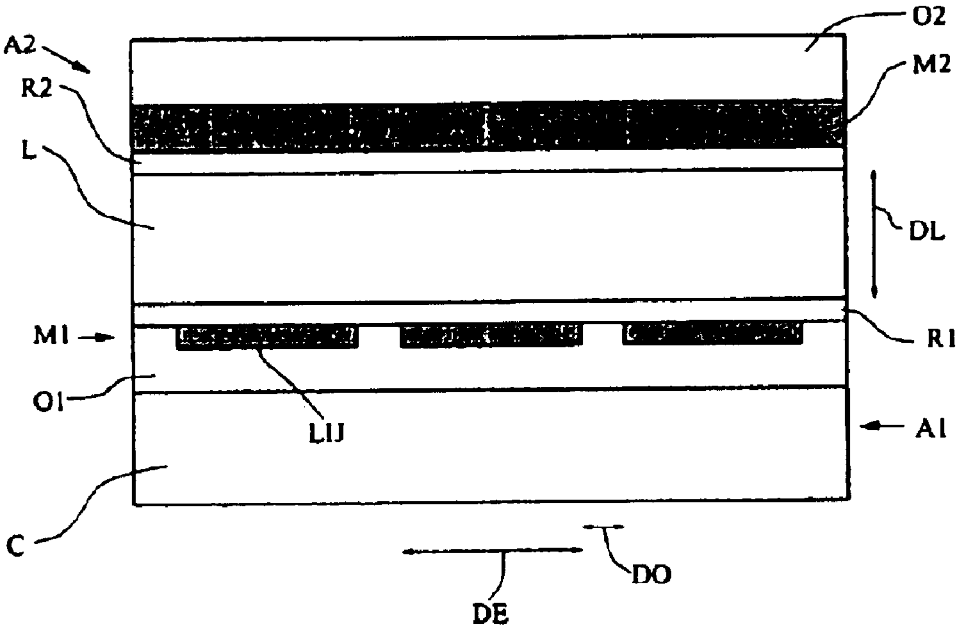
FIG. 2 shows a detailed cross-sectional view of the same structure as in FIG. 1.

The apparatus according to the preferred embodiment comprises two main modules. The first module A1 (FIG. 1) comprises an array M1 of selectively addressable electrodes LIJ (FIGS. 1 and 2) being disposed upon an insulating substrate O1, grown on a semiconductor substrate C (FIGS. 1 and 2). The second module A2 is made up of a single large electrode M2 which is fabricated on a substrate O2 (FIGS. 1 and 2) and is opposed to the said array M1. In between the two modules a micro-chamber (L in FIGS. 1 and 2) is formed, containing the particles (BIO in FIG. 1) in liquid suspension. Methods for containing the liquid suspension in the micro-chamber will be described later on. The first module A1 is made in silicon, according to known microelectronic technology, or any other suitable substrate materials, such as glass, silicon dioxide, plastic, or ceramic materials. An electrode may be of any size, preferably ranging from sub-micron (~0.1 μm) to several millimeters (mm) with 5 μm to 100 μm being the preferred size range for devices fabricated using micro-lithographic techniques, and 100 μm to 5 mm for devices fabricated using micromachining and/or printed circuit board (PCB) techniques. The device can be designed to have as few as under ten electrodes or as many as thousands or millions of electrodes. The distance DL between the two modules may vary according to the embodiments but is preferably in the order of magnitude of the electrode size DE (FIG. 2).

Electrodes can be coated by an insulating layer (R1 in FIG. 2) to prevent electrolysis due to the interaction of electrodes with the liquid medium,which may contain a high concentration of positive and negative ions. Such a layer may be avoided if either the electrodes are composed of material that does not chemically react with the liquid medium or the frequency of signals energizing electrodes is high enough to make electrolysis negligible. Finally, some circuitry, the purpose of which will be explained later in greater detail, may be placed underneath each electrode.

Array electrodes may be of any shape, depending on the effect to be achieved; for example's sake, an array M1 of square electrodes are shown in the preferred embodiment of FIG. 1, while FIG. 2 shows a cross-section of electrodes emphasizing their width and relative displacements (DE and DO).

Figure 3:
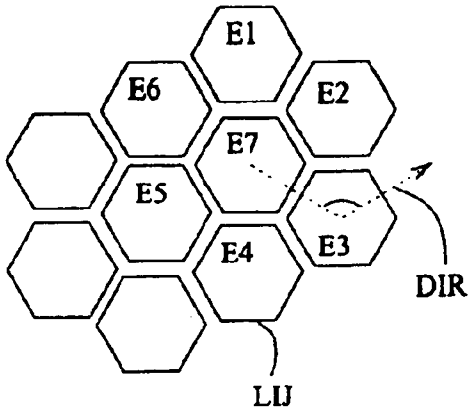
FIG. 3 shows an embodiment, of the electrode arrangement.

In an alternative embodiment, electrodes may be of hexagonal shape (as illustrated in FIG. 3), which allows the number of electrodes to establish a single potential cage to be reduced from 9 to 7 (as will be shown later) and offers a larger number of possible cage motion directions DIR (from 4 to 6).

The second main module A2 comprises a single large electrically conductive electrode (M2 in FIGS. 1 and 2) which is opposed to the first module A1. It also serves as the upper bound of chamber L containing the liquid suspension of particles. This electrode may be coated with an insulating layer (R2 in FIG. 2) to protect it against electrolysis and may have a mechanical support (O2 in FIGS. 1 and 2). In the preferred embodiment, this electrode is a single, planar surface of conductive glass, thus permitting visual inspection of the micro-chamber.

Figure 5:
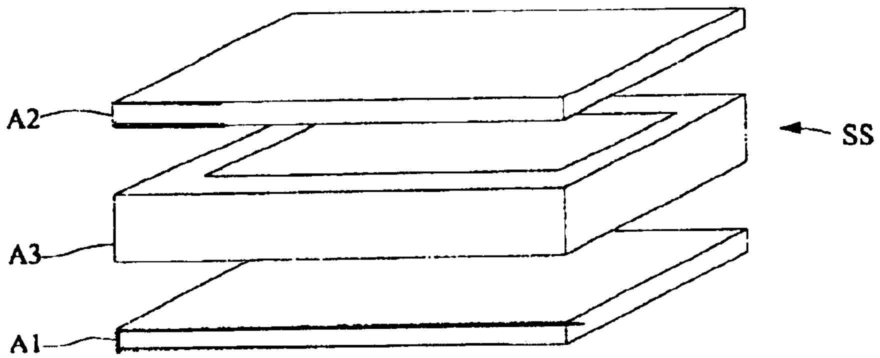
FIG. 5 shows a blow-up schematic diagram of the device emphasizing the presence of a third module.

A spacer A3 (FIG. 5) is used to separate the two modules (A1 and A2 in FIG. 5, in which A1 comprises R1, O1, M1 and C, while A2 comprises R2, O2, M2) by a given distance (DL in FIG. 2). The spacer may also be used to contain the sample for manipulation or analysis.

By applying appropriate time-varying signals to different subsets of electrodes, a potential cage S1 (FIG. 1 and FIG. 6) that may contain one or more particle BIO is established upon one or more electrode. The potential cage is located at some height above the array plane, the value of which depends on the signals applied, on the ratio of electrode size DE and pitch DO and on the distance between the two modules DL. By changing the subset of electrodes to which signals are applied, one or more potential cages may be moved around micro-chamber L in a direction parallel to the electrode array.

From simulation results, emerges that, for constant values of size DL, the greater the ratio between size DE and DO, the better the properties of the cage in terms of DEP force strength.

Method for Establishing Potential Cages

Figure 4:
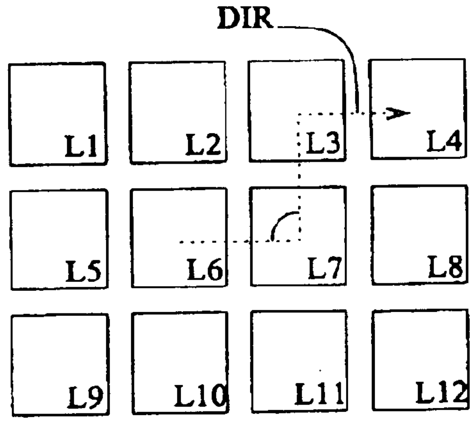
FIG. 4 shows an alternative embodiment of the electrode arrangement.

In order to establish potential cages on top of a single electrode, a pattern of voltage signals is applied to corresponding subsets of electrodes. FIG. 4 illustrates a set of electrodes L1–L12 in array M1, used as a reference for numerical simulations.

Defining:

$$V_{sq}(\omega t, \varphi) = \begin{cases} 1 & \text{if } \cos(\omega t + \varphi) > 0 \\ -1 & \text{if } \cos(\omega t + \varphi) \le 0 \end{cases}$$

as a square wave signal having period T, where $\omega = 2\pi/T$, the following voltage signals are applied to electrodes:

$$V_{L\alpha} = V_e \cdot V_{sq}(\omega t, \phi)\ \forall \alpha \in \{1\text{–}6, 8\text{–}12\}$$

$$V_{L7} = V_e \cdot V_{sq}(\omega t, \phi + \pi)$$

$$V_{M2} = V_c \cdot V_{sq}(\omega t, \phi + \pi)$$

where $V_{L\alpha}$, $\alpha \in \{1\text{–}12\}$ are signals applied to electrodes L1–L12, $V_{M2}$ is the voltage signal applied to M2, and $V_e$ and $V_c$ are constant values. Using voltage patterns as indicated above, the electric field phases are constant, so that equation (2) applies. Hence, the numerical simulations of the electric field magnitude will be used to verify the establishing of dielectrophoretic potential cages.

Figure 6:
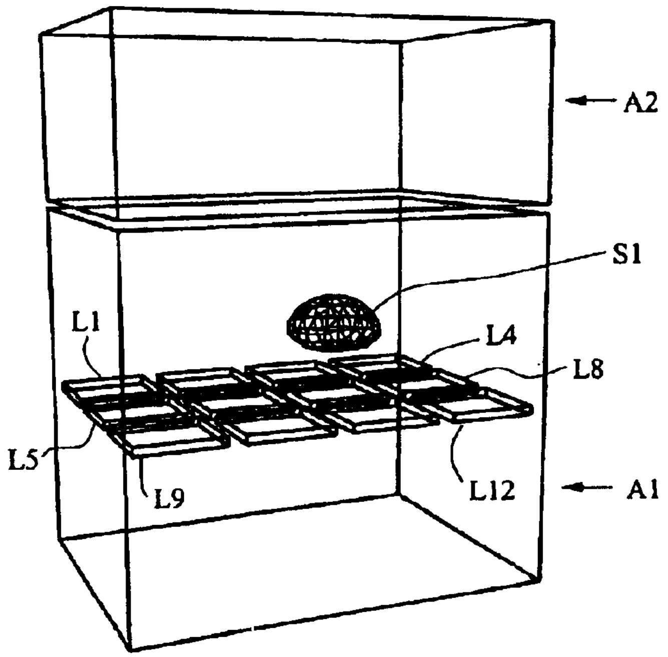
FIG. 6 shows a three-dimensional surface in which each point has the same root mean square (RMS) electric-field magnitude.

FIG. 6 shows the result of a numerical simulation regarding the same set of electrodes as illustrated in FIG. 4 energized by the above mentioned voltage signal patterns where: DE=5 μm, DO=1 μm, DL=10 μm, $V_e$=2.5V, $V_c$=0.V. Water is chosen as the liquid medium between the modules A1 and A2, with $\epsilon_m \simeq 81$. R2 is negligible and R1=1 μm. The plot in FIG. 6 shows a 3D environment containing a closed surface whose points are characterized by having a constant electric field magnitude (S1 in FIG. 6) at 400 V/cm. This proves, by virtue of equation (3), that the dielectrophoretic equipotential surface is likewise closed, hence a potential cage is established on top of L7. Thus, a pattern of only two signals, having the same frequency and counter-phase relationship, is needed to establish a minimum of the dielectrophoretic potential function on top of L7. From simulation it also emerges that by increasing $V_c \in [-2.5, 2.5]$V the dielectrophoretic forces of the cage increase, while the cage height decreases with respect to the array plane. In the preferred embodiment, in which square electrodes are employed, the minimum number of array electrodes for establishing a single dielectrophoretic potential cage is 9 (L2–L4, L6–L8, L10–L12 in FIG. 4). On the other hand, if a hexagonal array of electrodes is employed, as illustrated in FIG. 3, the minimum number of array electrodes for establishing a single dielectrophoretic potential cage is 7, such as electrodes E1–E7.

Figure 7:
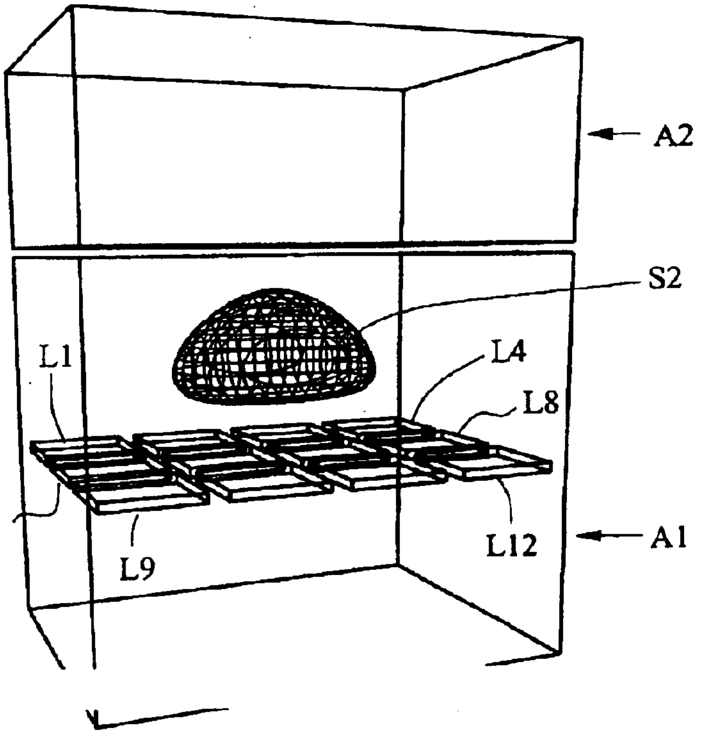
FIG. 7 shows the same plot as in FIG. 6 for a different set of signals applied.

In order to establish potential cages at a mid point on top of two electrodes, a different pattern of voltage signals is applied to corresponding subsets of electrodes. FIG. 7 shows the result obtained when the stimuli applied to the electrodes are as follows:

$$V_{L\alpha}=V_e \cdot V_{sq}(\omega t, \phi)\ \forall\alpha\in\{1\text{–}5, 8\text{–}12\}$$

$$V_{L6}=V_{L7}=V_e \cdot V_{sq}(\omega t, \phi+\pi)$$

$$V_{M2}=V_c \cdot V_{sq}(\omega t, \phi+\pi),$$

where all the other parameters are the same as before. S2 in FIG. 7 again shows a closed surface whose points have a constant electric field strength at 400 V/cm; where the center is, however, Located on top of the mid point between electrodes L6 and L7.

Figure 8:
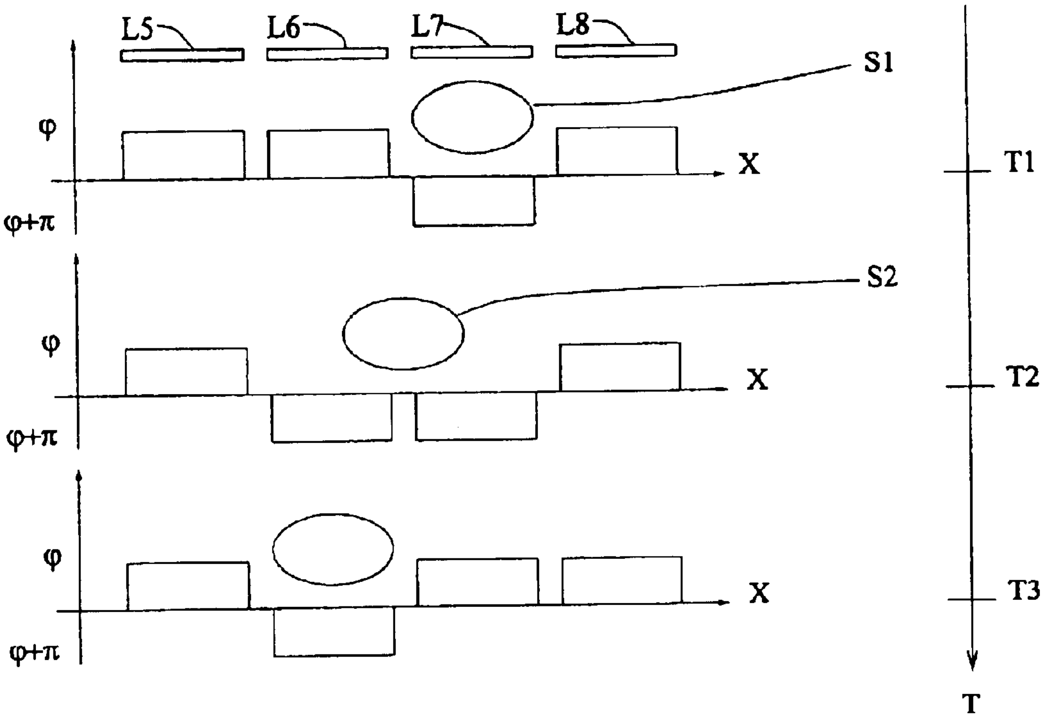
FIG. 8 sketches the cage motion principle highlighting the fundamental steps and their timing.

This last pattern of voltage signals, in combination with the previous one, can be used for moving potential cages in a programmed direction. More specifically, by repeatedly changing the subsets of electrodes to which in-phase and counter-phase signals are respectively applied, in particular by alternating and shifting the two patterns described in a given direction, it is possible to move the potential cage in that direction. As an example, FIG. 8 sketches three plots where the potential cage is moved from a position on top of L7 to another position on top of L6: the first at time T1, the second at T2 and the third at T3. In each plot the phase of electrodes L5, L6, L7, L8 is reported, showing the moving-cage principle. With increasing time, the electrode with phase $\phi+\pi$ shifts along a decreasing X direction in two steps: at T2 electrode L6 is connected to a signal having phase $\phi+\pi$ which is the same as L7 and then, at time step T3, the phase of L7 is reversed.

Obviously, the time interval between switching phases should be carefully chosen according to system characteristics: force intensity, fluid medium viscosity, particle size, etc. For this purpose it may be useful to employ embedded sensors to detect the presence/absence of one or more particles in each position so that the time distance can be adjusted according to sensor data.

Figure 9:
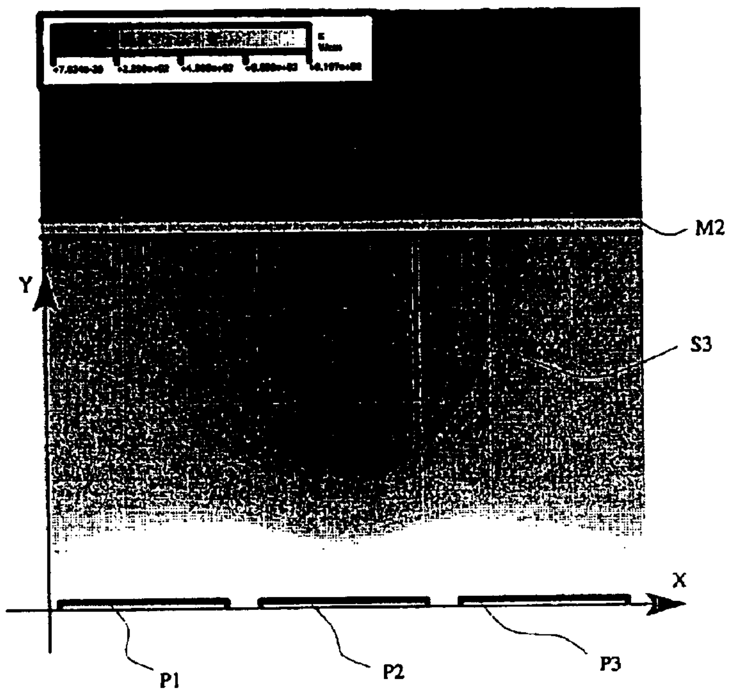
FIG. 9 shows a 2-D plot of the RMS magnitude of the electric field on a vertical section orthogonal to the electrodes, assuming that electrodes extend for the whole device length.
Figure 10:
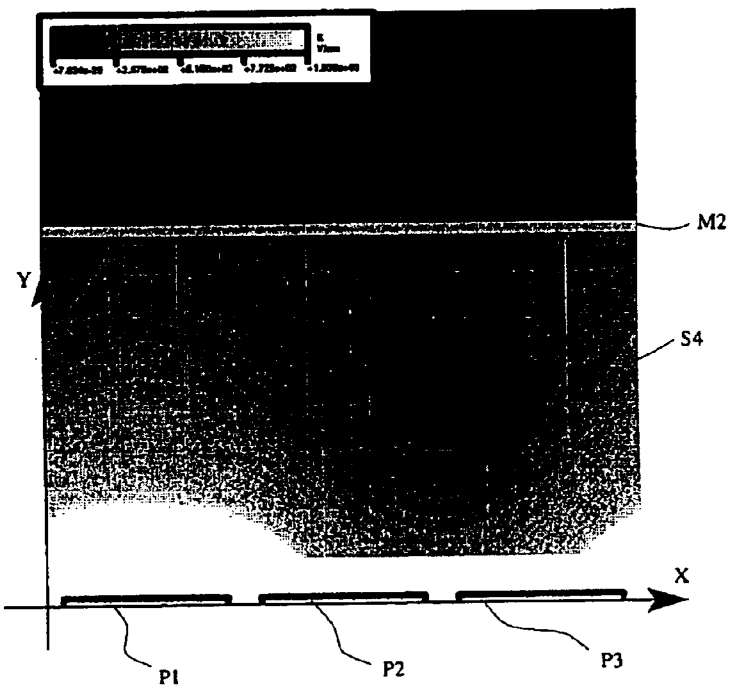
FIG. 10 shows the same plot as in FIG. 9 for a different set of voltages applied.

To illustrate the capability of the invention to move closed dielectrophoretic cages, FIGS. 9 and 10 show 2-D simulations of the electric field distribution along a cross section of the device. When the voltages applied to electrodes P1, P2 and P3, and the lid electrode M2 are:

$$V_{P\alpha}=V_e \cdot V_{sq}(\omega t, \phi)\ \forall\alpha\in\{1, 3\}$$

$$V_{P2}=V_e \cdot V_{sq}(\omega t, \phi+\pi)$$

$$V_{M2}=V_c \cdot V_{sq}(\omega t, \phi+\pi)$$

where, $V_e$=2.5V and $V_c$=0, the resulting electric-field distribution is as shown in FIG. 9, in which the darker regions S3 mean a lower electric-field magnitude, while the brighter regions mean a higher electric-field magnitude.

Figure 11:
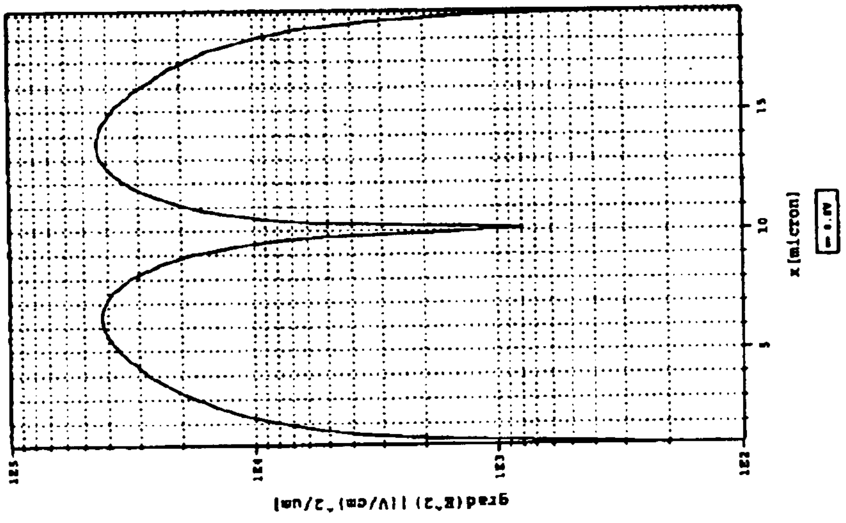
FIG. 11 shows a plot of the absolute value of the gradient of the square RMS magnitude of the electric field along a horizontal cross section of the plot in FIG. 9 passing through the dielectrophoretic potential minimum (4.3 $\mu$m above the electrode surface)
Figure 12:
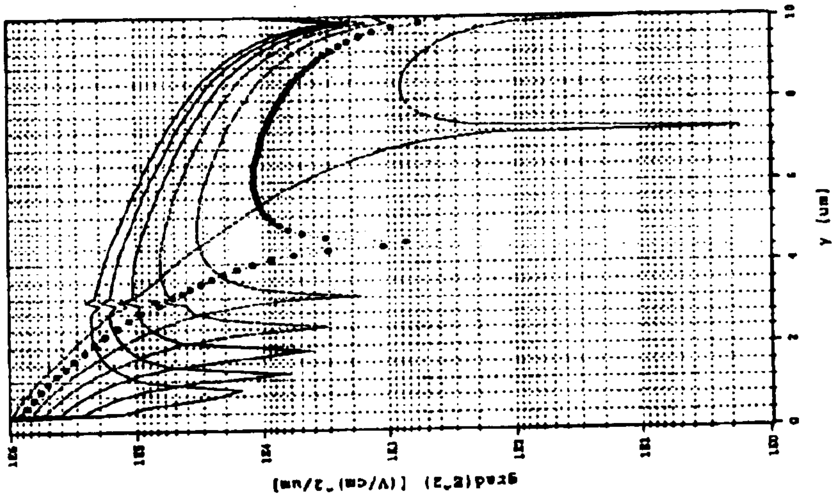
FIG. 12 shows a plot of the absolute value of the gradient of the square RMS magnitude of the electric field, along a vertical section of the plot in FIG. 9 passing through the dielectrophoretic potential minimum for different values of the voltage applied to the upper electrode.

FIG. 11 shows a plot (in log scale) of the absolute value of the gradient of the square electric field magnitude, taken along a horizontal cross section of the plot of FIG. 9 passing through the center of the cage (4.3 $\mu$m above the array surface). This kind of plot is very useful since the values of the plots are directly proportional to the dielectrophoretic force, from which one can pinpoint the location of the minimum dielectrophoretic potential (where dielectrophoretic forces are equal to zero). FIG. 12 shows a similar plot taken along a vertical cross section of the plot of FIG. 9 including the center of the potential cage for different values of $V_{c1}$ ranging from +2.5V to −0.5V.

In order to establish a dielectrophoretic potential cage in the region above the mid point between P2 and P3, the following voltages can be applied:

$$V_{P1}=V_e \cdot V_{sq}(\omega t, \phi)$$

$$V_{P2}=V_{P3}=V_e \cdot V_{sq}(\omega t, \phi+\pi)$$

$$V_{M2}=V_c \cdot V_{sq}(\omega t, \phi+\pi)$$

where $V_e$=2.5V and $V_c$=1.5V. The result is shown in FIG. 10 where S4 is the region in which the potential cage is located.

Figure 13:
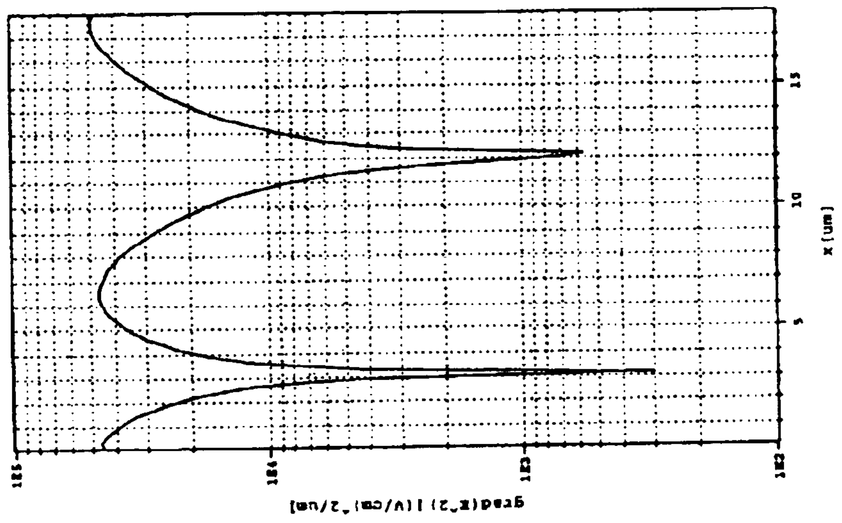
FIG. 13 shows a plot of the absolute value of the gradient of the square RMS magnitude of the electric field, along an horizontal cross section of the plot in FIG. 10 passing through the dielectrophoretic potential minimum.
Figure 14:
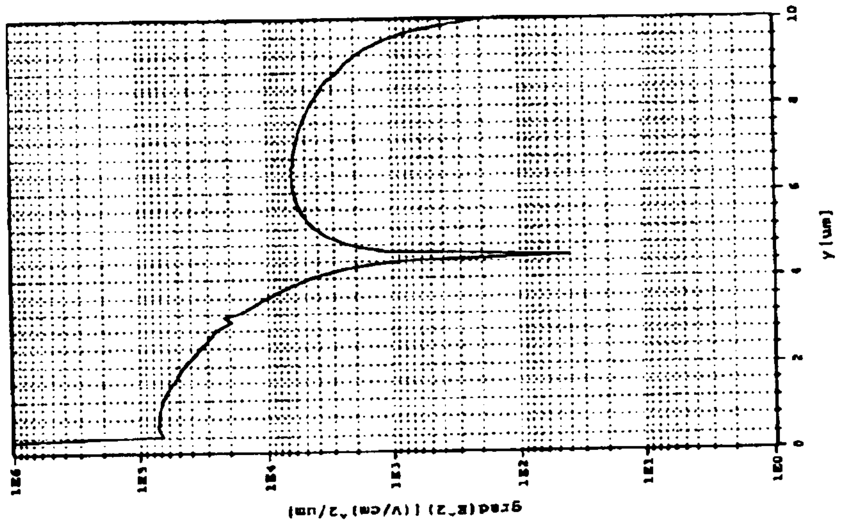
FIG. 14 shows a plot of the absolute value of the gradient of the square RMS magnitude of the electric field, along a vertical section of the plot in FIG. 10 passing through the dielectrophoretic potential minimum.

FIG. 13 shows a plot of the absolute value of the gradient of the square electric field magnitude, along a horizontal cross section of the plot in FIG. 10 including the cage center, in the case of $V_c$=1.5V; the height of the cage center from the array surface is 4.3 $\mu$m. The presence of two values with gradient equal to zero in FIG. 13 is due to a maximum on top of electrode P1 and to a minimum located in the region above the mid point between P2 and P3. A given particle subject to such a dielectrophoretic force field would find a stable equilibrium point at the aforesaid minimum and an unstable equilibrium point at the aforesaid maximum. FIG. 14 shows a similar plot taken along a vertical cross section of the plot of FIG. 10 passing through the cage center, in the case of $V_c$=1.5V.

To summarize, the establishing of dielectrophoretic potential cages, as disclosed by the present invention, can be achieved by using a pattern of as few as two voltage signal having the same frequency and counter-phase relationship. Furthermore, movement of such cages along a guide path parallel to the array surface can be achieved by simply selecting convenient patterns of subsets of electrodes to which apply the two above mentioned signals at different time steps. The electrode voltage waveforms may either come from on-chip oscillators or from external generators.

Preferred Embodiment: Integration on Semiconductor Substrate

Figure 15:
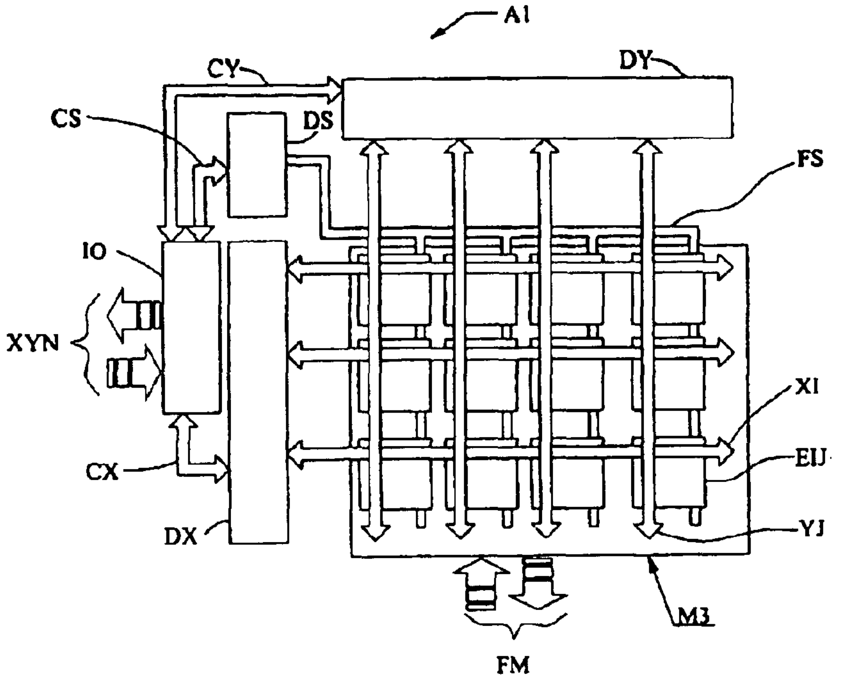
FIG. 15 shows a simplified block diagram of the first substrate.
Figure 17:
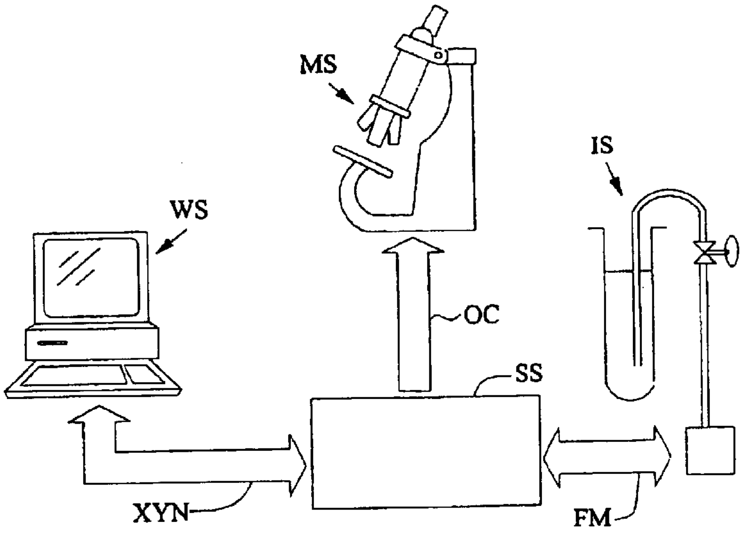
FIG. 17 sketches the measurement instruments which may be interfaced with the apparatus.

A schematic diagram of the first module A1 in the preferred embodiment is illustrated in FIG. 15. A silicon substrate embeds an array M3 of micro-locations EIJ that are independently addressed by proper addressing circuits, DX e DY, by means of a number of electrical communication channels running along vertical lines YJ and horizontal lines XI. The module communicates with external signals XYN by means of an interface circuit IO, which in turn communicates by means of connection CX and CY with addressing circuits DX e DY, and by means of a set of connections CS controls the waveform generation and sensor readout circuit DS for delivering the signal to be applied to the micro-locations EIJ and for collecting signals from the sensors in the micro-locations by means of connections FS. The apparatus is connected with a number of fluidic communication channels FM with the external means IS for the management of liquid suspension medium containing the particles. Various instruments can be used for interfacing to the device SS by means of electrical communication channels XYN such as: computer, external waveform generators, analyzers etc. (WS in FIG. 17), and by means of fluidic dynamic channels, such as micro-pumps IS and by means of optical channels OC such as microscope, camera, etc. MS.

Figure 16:
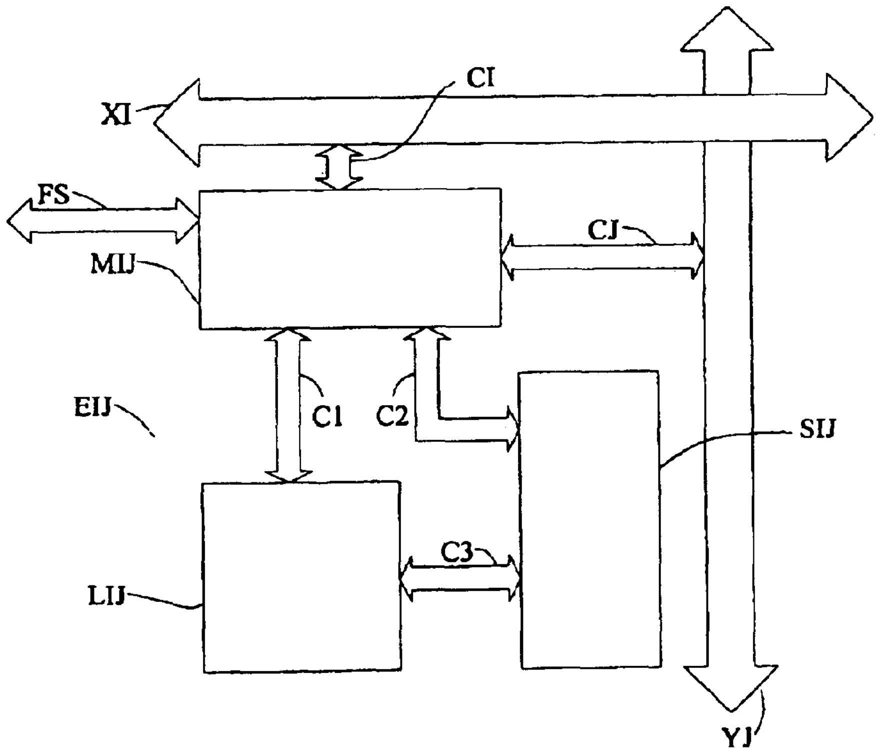
FIG. 16 sketches the block diagram of a cell in the array.

In the preferred embodiment each micro-location EIJ (FIG. 16) comprises at least one electrode LIJ to be energized by the electrical signals, a circuit for the electrode signal management MIJ (FIG. 16) and a sensor SIJ to detect the presence/absence of particles on top of each cell. Each of these blocks may communicate with others inside the same element by means of local connections C1, C2, C3. Moreover the circuit for electrode signal management (MIJ FIG. 16) can communicate with external circuits by means of global connections XI and YJ. The circuit MIJ may contain switches and memory elements suitable for selecting and storing the routing of pattern signals to electrode LIJ. Since two voltage signal patterns are sufficient for establishing and moving dielectrophoretic potential cages, as explained in the previous section, one electronic memory means is sufficient to determine whether the electrode will be connected to the in-phase or to the counter-phase signal. To optimize the space available, various different arrangements of LIJ, SIJ and MIJ are possible: for example LIJ may entirely overlap MIJ and partially cover SIJ or simply be placed beside SIJ according to the microelectronic technology rules.

A peculiar characteristic of the present invention considered to be unique from prior art dielectrophoretic devices, consists in its ability to integrate on the same substrate both actuators, for biological particle manipulation, and sensors for detection of particles. Some indicative but not exclusive examples of integrated sensors are shown in FIGS. 21, 22 and 23.

Figure 21:
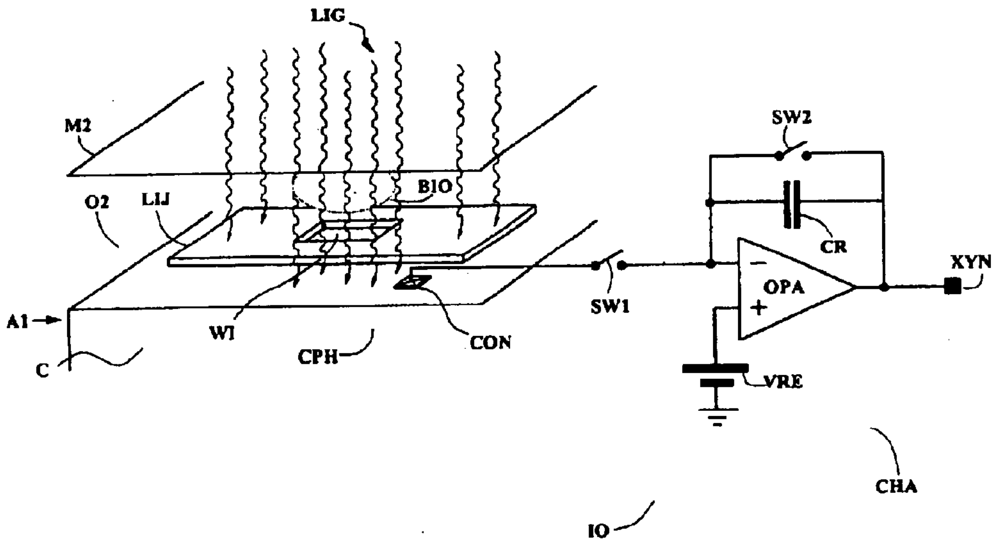
FIG. 21 shows an embodiment of an integrated optical sensor.

FIG. 21 sketches an implementation of a sensing scheme using an optical sensor to detect the presence/absence of a biological particle BIO. If the lid A1 is made of transparent and conductive material, a window WI can be opened on the electrode LIJ. The size of WI is negligible for modifying the dielectrophoretic potential but large enough to permit a sufficient amount of radiation to impinge onto the substrate. Underneath LIJ a photo-junction CPH working in continuous or storage mode is realized into substrate C according to known art. The presence/absence of the biological element BIO determines the amount of optical energy reaching the photodiode, causing a change of charge accumulated across CPH during the integration time. This variation is detected by a conventional charge amplifier CHA composed of an amplifier OPA, a feedback capacitor CR and a reference voltage source VRE. The connection to this charge amplifier is established by enabling a switch SW1 after switch SW2 has been opened, thus permitting the accumulated charge to be integrated onto CR. The photodiode and charge amplifier are designed, according to known art, to obtain a signal to noise ratio sufficient to detect the presence/absence of the biological particle. As an example, with reference to a structure with the dimensions previously described for simulations, and assuming a 0.7 $\mu$m CMOS technology, we may consider a photodiode of $1\times2$ $\mu$m in the substrate under the electrode. Analyzing the signal to noise ratio according to known art, a variation of 10% of the particle transparency with respect to the liquid medium can be revealed using integration times larger than 3 $\mu$s.

Figure 22:
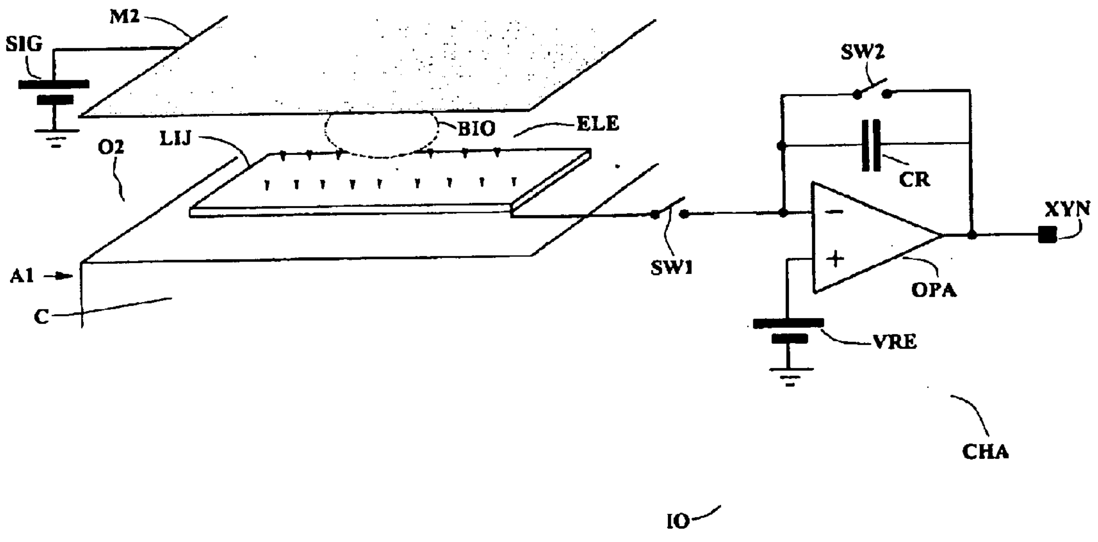
FIG. 22 shows an embodiment of an integrated capacitive sensor.

In another embodiment, capacitive sensing is used as sketched in FIG. 22. A voltage signal SIG applied to the lid A1 induces a variation in the electric field ELE between A1 and LIJ. The corresponding capacitance variation can be detected by a charge amplifier CHA similar to the case of optical sensing.

Figure 23:
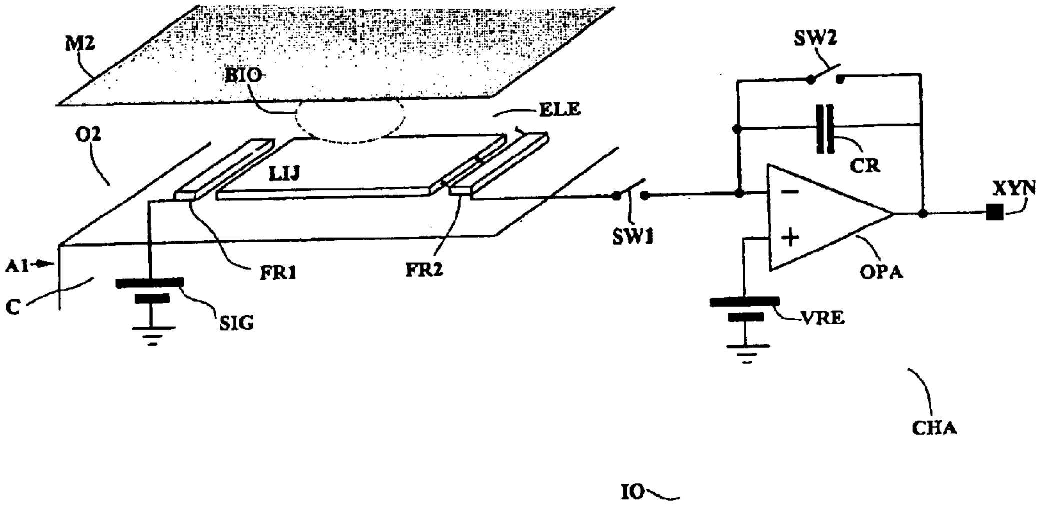
FIG. 23 shows an embodiment of an integrated capacitive sensor.

In FIG. 23 another implementation of capacitive sensing is sketched, using two electrodes FR1 and FR2 coplanar to element LIJ. A voltage signal SIG applied to the element FR1 determines a variation in the fringing electric field ELE towards FR2. The interposition of biological element BIO in the region affected by this electric field causes a variation in the capacitance value between FR1 and FR2. This variation is detected by a charge amplifier CHA similar to the previous sensing schemes. The electrodes FR1 and FR2 may be omitted if the elements LIJ of the adjacent locations are used in their place. It is to be understood that more than one of the above described sensing principles may be used in the same device to enhance selectivity. As an example, different particles having the same transmissivity but a different dielectric constant, or having the same dielectric constant and different transmissivity may be discerned, by using a combination of capacitive and optical sensors.

Figure 18:
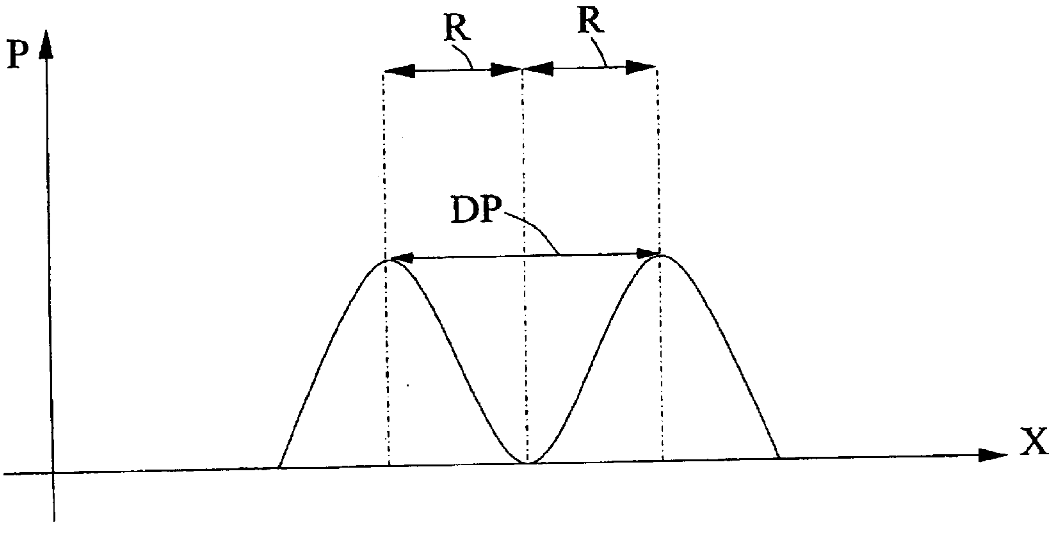
FIG. 18 shows a schematic plot of the nDEP potential along a generic section, comparing cage size with particle one.

An outstanding feature believed to be characteristic of the present invention is the possibility to isolate single microorganisms of a size within the micron or sub-micron range, and to do so on a large number of them; indeed the size of microorganism which can be isolated will shrink following the advances in standard microelectronic fabrication technologies, in line with the shrinking in the minimum feature sizes that is characteristic of the technology. Indeed, if the size of the dielectrophoretic potential cage is small enough, no more than one particle of a given size may be trapped inside the cage. In order to better understand this feature of the device one can consider the distribution of the dielectrophoretic potential P (FIG. 18) along a horizontal cross section passing through the center of the cage, as established by the method disclosed, which has the typical behavior shown in FIG. 18 where two local maxima represent the borders of the cage potential along direction X. If the relative distance DP is twice the particle radius R to be isolated, then only one of the particles of the neighborhood will find room in the cage, so that if the cage is already occupied by a particle, an outward net force is exerted on other candidate particles, thus moving excess particles into either empty neighborhood cages or lateral reservoirs designed to contain the overspill particles. It is to be noted that if the above operation needs to be applied to all particles of the sample, the particle density should be smaller than the cage density.

The dielectrophoretic cage size is solely limited by the area dedicated to the circuitry of each electrode, which in turn depends on the technology adopted. To overcome this limit, a different electrode arrangement may be used, as disclosed in what follows, in which alternative electrode topologies are employed that are less flexible but more optimized with respect to potential cage size and targeted to applications requiring greater sensitivity such as sub-micron microorganism manipulation and counting. For applications requiring potential cages smaller than the area needed by electrode circuitry, alternative embodiments may be employed in order to achieve better area optimization.

Figure 19:
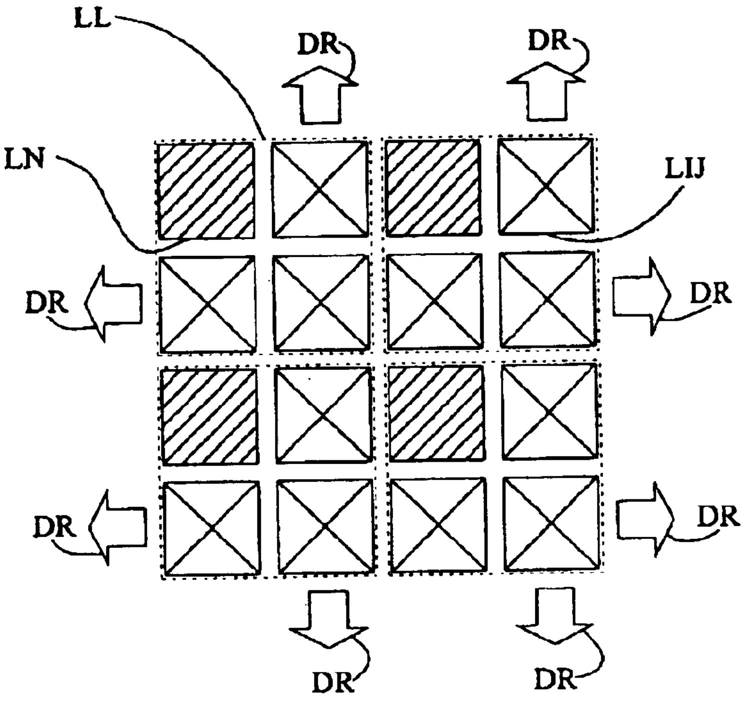
FIG. 19 sketches a special electrode layout which enables one to optimize the area available for the electrode programming circuit.

As an example, in order to increase the area available for circuitry by 25%, it is feasible, using the same arrangement of electrodes, to connect an electrode LN (FIG. 19) out of a cluster of four LL to a fixed voltage signal pattern (for example to the in-phase one). From now on, we will refer to electrodes of type LN as "non-programmable electrodes" since they cannot be switched among the various voltage signal patterns but are tied to a fixed one. The above embodiment has the shortcoming of restricting the motion of potential cages solely along guide paths DR. On the other hand, the electrode arrangement shows the advantage of saving area for circuitry due to the fact that MIJ and SIJ blocks are not implemented in non-programmable electrodes LN.

Figure 20:
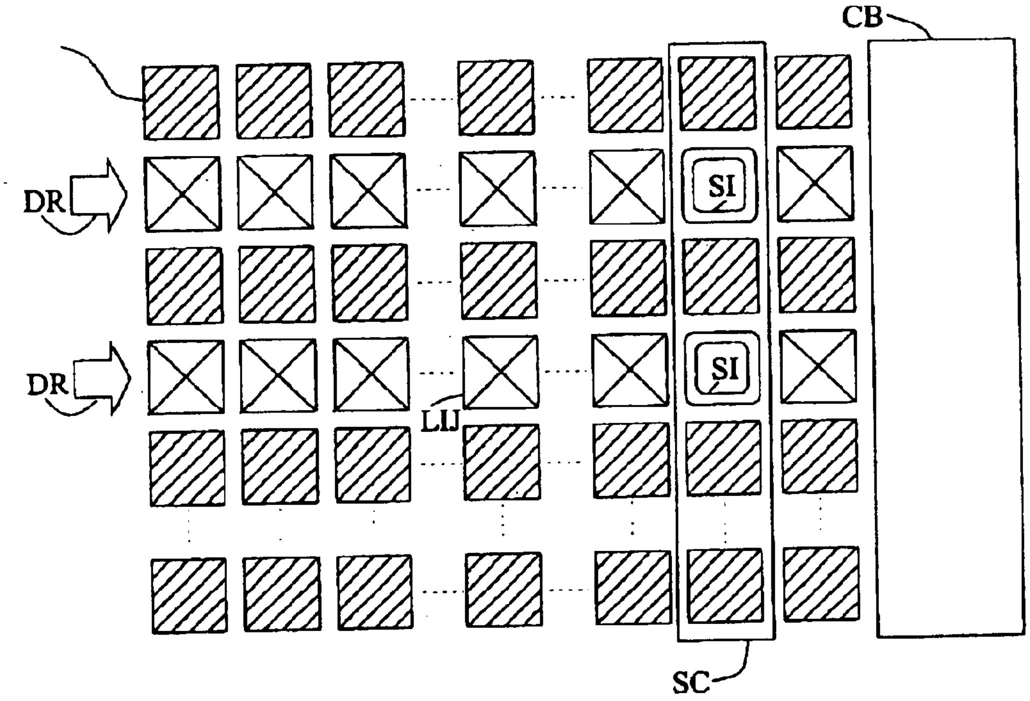
FIG. 20 sketches a special electrode layout which allows for optimization of the area available for the electrode circuitry relating to a specific embodiment targeted to particle counting.

Another alternative embodiment which further exploits the method for shrinking cage size at the expense of device flexibility is disclosed in FIG. 20. In this case the direction of motion is reduced to one dimension, along guide paths DR, and the cells SI (FIG. 20), designed for sensing the presence and possibly the type of particles, are arranged along one column SC, orthogonal to the allowed motion direction. Using proper signals, potential cages are regularly established along rows and moved along the guide paths DR throughout the column SC into a chamber CB designed to contain the particles whose number (and possibly type) has already been detected. Since motion directions along vertical guide paths are not used, non programmable electrodes LN are floor planned to save area available for cell circuitry. Hence, the area available for cell circuitry and for sensors is optimized since only one electrode in two needs to be programmed, and only cells SI need to integrate a sensor. The main shortcoming of this last alternative embodiment as compared to the preferred one resides in the longer time required for detecting the particles in the sample, since it depends on the number of row cells that particles must step through before reaching the sensors. On the other hand, the latter alternative embodiment can achieve smaller cage size, thus counting smaller particles.

Another approach according to the present invention is that of estimating the number of particles smaller than feasible cage size by taking advantage of sensors whose output is proportional to the number of particles contained into a cage. In using this method, cage size does not need to be set to minimum since the total number of particles can be estimated by summing the number of them in each cage, even if the the latter contain a plurality of particles. The main drawback of this approach is that the output of the sensors is designed to depend only on the number of particles, regardless of their type, so that their type cannot be detected.

Once the sample is inserted into the device—by means and instruments known to those with ordinary skill in the art such as micro-pump syringes etc., in fully automated or manual mode depending on user requirements—it is possible to work at the frequency with which one or more species of microorganisms are subject to negative dielectrophoresis; thus it is possible to trap the aforementioned biological objects into the dielectrophoretic potential cages and move them in longer or shorter paths around the device. The proposed device has the novel feature of moving the particles in suspension within the liquid instead of moving the liquid itself, thus reducing the need for complex and expensive fluidics procedures, enabling selected bodies to accumulate in proper sites or chambers and preventing the particles from being stressed by friction and collision. During the modes of operation described so far, the embedded sensors can monitor the presence of particles, thus providing for adaptive control of the device and its functionality in a feedback loop.

One important operation the device can perform is to characterize a sample of particulate and solubilized matter by differences in the physical properties of either the population or its components. This can be achieved by using the feature of guided cages, the mobility and strength of which depend on the physical properties and morphology of the biological matter being analyzed such as size, weight, polarizability and conductivity, which will vary from species to species.

With its unique feature of inducing independent movement of one or more particles trapped in potential cages along guide paths, the device may easily be programmed to achieve several tasks: e.g. to separate one kind of microorganism from a mixture of species by using their physical, dielectric and conductive properties. Another possible application of the proposed device consists of making two or more microorganisms collide by first trapping the objects in different cages and then moving them towards the same location of the device. As an example of the wide range of application afforded by the device according to the present invention, various different methods for manipulating particles arc hereinafter disclosed, though again with the proviso that examples used herein are not intended as limiting the spirit of the invention.

It is envisioned that alternate or equivalent configurations of the present invention may be adopted without any restriction of the general invention as portrayed. Finally, it is intended that both materials and dimensions may be varied according to the user or device application requirements.

Method for Separating Particles or Different Types by Difference in Dielectrophoretic Forces It is assumed that the sample in the device chamber contains a mixture of particles of at least two different types which are subject to negative dielectrophoresis and positive dielectrophoresis respectively, at a given frequency. By energizing the electrodes with periodic signals at that frequency, potential cages are established, into which the particles of the first type are attracted and from which the particles of the second type are repelled. Hence by moving the potential cages toward a separate area of the device only the particle of the first type will be displaced. That area may be, for example, a separate chamber in the device where particles of the first type may be further collected, counted, mated with other particles etc. It should be noted that in this case more than one particle per cage may be allowed.

Method for Separating Particles of Different Types by Single-particle Entrapment, Type Detection and Motion It is assumed that the sample in the device chamber contains a mixture of particles of at least two different types. It is further assumed that the size of the cages is such that only one particle may be trapped in each cage, and that each location on which the cages are established comprises a sensor able to detect the type of particle trapped in that cage, if any. This sensor may, for example, be of capacitive and/or optical type. After establishment of the dielectrophoretic potential cages, the particles in each cage are discriminated, and all cages trapping particles of one type are moved toward a separate area of the device so that only particles of that type will be present in that area. That area may be a separate chamber in the device where the particles may be further collected, counted, mated with each other or with other particles etc. As used herein and in what follows, the term 'type' should be seen as referring to characteristics which may be discriminated by using sensors. In other terms, two particles made of the same matter, but of different size, may be regarded as belonging to different types if the sensor embedded in the device discriminates the two. Again, two particles made of different matter, but which cause the same output of the embedded sensor, may be regarded as belonging to the same type.

Method for Separating Particles of Different Types by Single-particle Entrapment, Motion, Type Detection, and Motion This method is similar to the previous one, except for the fact that the locations on which the cages are first established need not comprise a sensor. Thus it is first necessary to displace particles—by moving cages—toward locations where a sensor is able to detect their type, and then further displace the particles, according to their type, toward different areas of the device. These areas may be, for example, separate chambers in the device where the particles may be further collected, counted, mated with each other or with other particles, etc.

Method for Counting Particles of a Type by Single-type of Particles Entrapment and Number Detection It is assumed that the sample in the device chamber contains a single type of particle, and that each location on which the cages are established comprises a sensor which is able to detect the number of particles trapped in that cage. This can be achieved if the output response of the sensor is proportional to the number of particles trapped in the cage associated. The total number of particles in the sample can be counted quite simply by summing the number of particles detected in each cage.

Method for Counting Particles of Different Types by Single-particle Entrapment and Type Detection It is assumed that the sample in the device chamber contains one or more types of particle. It is further assumed that the size of the cages is such that only one particle may be trapped in each cage, and that each location on which the cages are established comprises a sensor able to detect the presence and type of the particle trapped in that cage, if any. Counting the number of particles of each type can thus be simply achieved by establishing potential cages, detecting the type of particle in each cage, if any, and separately summing the number of cages trapping particles of the same type.

Method for Counting Particles of Different Types by Single-particle Entrapment, Motion and Type Detection This method is similar to the previous one, except for the fact that the locations on which the cages are first established need not to comprise a sensor. Thus, it is first necessary to displace particles—by moving cages—toward locations where a sensor is able to detect their type. Then the type of any particle present in the cages at the sensing locations is detected. If other cages whose content has not yet been monitored are left over, the cage at the sensing location is displaced to allow cages whose content has not yet been detected to be displaced above the same sensing location. This last operation is repeated until the content of all e cages has been detected. Counting the number of particles of each type can therefore be achieved by separately summing the number of cages trapping particles of the same type.

What is claimed is:

1. An apparatus for manipulating particles immersed in a fluid by dielectrophoresis, comprising:

a) a first substrate;

b) a group of electrodes comprising a first electrode array comprising a plurality of electrodes having spaces there between formed on the first substrate and a second electrode array comprising at least one electrode, the second electrode array facing and being spaced apart from the first electrode array, the particles and the fluid being placed in a region between the first electrode array and the second electrode array; and c) means for establishing a non-uniform electric field, having constant magnitude over at least one imaginary closed surface located entirely in the fluid, and where the means for establishing a non-uniform electrical field comprises means for applying a first periodic signal having a frequency and a first phase to a first subset of the plurality of electrodes in the first electrode array and at least one other periodic signal having the frequency and a second phase, opposite to the first phase, to at least one other subset of the plurality of electrodes in the first electrode array; and where the electrode of the second array faces the plurality of electrodes of the first electrode array, and is formed on a second substrate opposed to the first substrate.

2. The apparatus according to claim 1, where the first substrate comprises sensing means for detecting the presence of one or more of the particles.

3. The apparatus according to claim 1, where the second substrate comprises sensing means for detecting the presence of one or more than one of the particles.

4. The apparatus according to claim 2, where the sensing means include electric-field measuring means for detecting variations in the electrical characteristics in at least a portion of the region between the first electrode array and the second electrode array.

5. The apparatus according to claim 4, where the electric-field measuring means include at least one electrode of the second electrode array and at least one electrode of the first electrode array.

6. The apparatus according to claim 4, where the electric-field measuring means include a first electrode or the first electrode array and at least one other electrode of the first electrode array.

7. The apparatus according to claim 1, where the second electrode array is substantially transparent.

8. The apparatus according to claim 2, where the sensing means include optical-energy measuring means for detecting variations in the optical characteristics in at least a portion of the region between the first electrode array and the second electrode array.

9. The apparatus according to claim 1, further comprising means for changing the first periodic signal or the at least one other periodic signal, or both the first periodic signal and the at least one other periodic signal to do one or more than one of the following contract the at least one imaginary closed surface, delete the at least one imaginary closed surface, establish the at least one imaginary closed surface, expand the at least one imaginary closed surface and move the at least one imaginary closed surface.

10. The apparatus according to claim 1, further comprising means for changing the composition of the first or the at least one other subset of the plurality of electrodes, or both the first and the at least one other subset of the plurality of electrodes to do one or more than one of the following: contract the at least one imaginary closed surface, delete the at least one imaginary closed surface, establish the at least one imaginary closed surface, expand the at least one imaginary closed surface and move the at least one imaginary closed surface.

11. The apparatus according to claim 1, further comprising a spacer between the first substrate and the second electrode array;

where the spacer has at least one opening; and where the spacer forms at least one chamber between the first substrate and the second electrode array.

12. The apparatus according to claim 1, further comprising a spacer integrated in the first substrate;

where the spacer has at least one opening; and where the spacer forms at least one chamber between the first substrate and the second electrode array.

13. The apparatus according to claim 1, where at least one electrode of the plurality of electrodes is connected to circuit means, and where the circuit means comprises:

a) addressing input means;

b) data input/output means;

c) reference input means; and d) at least one memory element; and whereby the periodic signal applied to the at least one electrode is derived from the reference input according to a value stored in the at least one memory element programmed by the addressing input means and the data input/output means.

14. The apparatus according to claim 13, where the circuit means further comprises sensing means.

15. The apparatus according to claim 1, where at least one or the electrodes of the first electrode array has a rectangular shape.

16. The apparatus according to claim 1, where at least one or the electrodes of the first electrode array has a hexagonal shape.

17. The apparatus according to claim 1, where the second electrode array consists of a single electrode.

18. The apparatus according to claim 1, where the first substrate is a monolithic semiconductor substrate.

19. A method for manipulating particles immersed in a fluid placed in a region between a first and a second electrode arrays belonging to a group of electrodes, the first electrode array formed on the first substrate, the second electrode array comprising at least one electrode and formed on a second substrate opposed to the first substrate, the electrode of the second electrode array facing and being spaced apart from the first electrode array, the first electrode array comprising a plurality of electrodes having spaces there between, the method comprising:

applying a first periodic signal having a frequency and a first phase to a first subset of the plurality of electrodes in the first electrode array and at least a second periodic signal having the frequency and a second phase, opposite to the first phase, to at least one other subset of the plurality of electrodes in the first electrode array, thereby establishing a non-uniform, electric field having constant magnitude over at least one imaginary closed surface located entirely in the fluid, whereby the particles are either attracted or repelled by dielectrophoresis from a portion of the region enclosed by the at least one imaginary closed surface, depending on electrical properties of the particles and the fluid.

20. A method according to claim 19, where, in the step of applying a first and a second periodic signals, at least one particle is attracted toward a first portion of the region; further including the step of:

applying different periodic signals to the subsets of the group of electrodes, at least one of the different periodic signals having the frequency and the first phase and at least another of the different periodic signals having the frequency and the second phase, thereby displacing the at least one imaginary closed surface and attracting the at least one particle toward a second portion of the region enclosed by the at least one imaginary closed surface.

21. A method according to claim 19, where, in the step of applying a first and a second periodic inputs, at least one particle is attracted toward a first portion of the region; further including the step of;

changing the composition of the first subset of the group of electrodes or the at least one other subset of the group of electrodes, or both the first subset of the group of electrodes and the at least one other subset of the group of electrodes, thereby displacing the at least one imaginary closed surface and attracting the at least one particle toward a second portion of the region enclosed by the at least one imaginary closed surface.

22. A method according to claim 20, where the step of applying different periodic signals further comprises changing the composition of the subsets and applying the first and second periodic signals to the changed subsets of the group of electrodes.

23. A method for separating different types of particles immersed in a fluid placed in a region between a first and a second electrode arrays belonging to a group of electrodes, the first electrode array formed on the first substrate, the second electrode array facing and being spaced apart from the first electrode array and formed on a second substrate opposed to the first substrate, the first electrode array comprising a plurality of electrodes having spaces there between, the method comprising:

a) applying a first periodic signal having a frequency and a first phase to a first subset of the first electrode array and at least a second periodic signal having the frequency and a second phase, opposite to the first phase, to at least one other subset of the first electrode array, thereby establishing a non-uniform electric field having constant magnitude over at least one imaginary closed surface located entirely in the fluid, whereby the particles of a first type are attracted by dielectrophoresis toward a first portion of the region enclosed by the at least one imaginary closed surface and particles of different types are repelled by Dielectrophoresis from the first portion of the region enclosed by the at least one imaginary closed surface; and b) changing the composition of the first subset of the group of electrodes or the at least one other subset of the group of electrodes, or both the first subset of the group of electrodes and the at least one other subset of the group of electrodes, thereby only particles of the first type are moved toward a second portion of the region enclosed by the at least one imaginary closed surface.

24. A method for manipulating different types of particles immersed in a fluid placed in a region between a first and a second electrode arrays belonging to a group of electrodes, the first electrode array formed on the first substrate, the second electrode array facing and being spaced apart from the first electrode array and formed on a second substrate opposed to the first substrate, the first electrode array comprising a plurality of electrodes having spaces there between, the method comprising:

a) applying a first periodic signal having a frequency and a first phase to a first subset of the first electrode array and at least a second periodic signal having the frequency and a second phase, opposite to the first phase, to at least one other subset of the first electrode array, thereby establishing a non-uniform electric field having constant magnitude over multiple imaginary closed surface located entirely in the fluid, whereby the particles are attracted by dielectrophoresis toward and trapped in different portions of the region enclosed by the imaginary closed surfaces, and where each of the portions is able to trap only one particle; and b) sensing the type of each particle trapped in the portions.

25. A method according to claim 24, for separating different types of particles immersed in a fluid, further comprising the step of:

changing the composition of the first subset of the group of electrodes or the at least one other subset of the group of electrodes, or both the first subset of the group of electrodes and the at least one other subset of the group of electrodes, thereby a first subset of the imaginary closed surfaces are displaced toward a first area, the first subset of the imaginary closed surfaces being composed of imaginary closed surfaces which trap particles of a first type, in order to move the particles of the first type toward the first area.

26. A method according to claim 25, further comprising, before the step of sensing the type of each particle trapped in the portions, the step of sequentially displacing the imaginary closed surfaces toward at least one sensing location, in order to move trapped particles toward the sensing location.

27. A method for counting the number of particles immersed in a fluid placed in a region between a first and a second electrode arrays belonging to a group of electrodes, the first electrode array formed on the first substrate, the second electrode array facing and being spaced apart from the first electrode array and formed on a second substrate opposed to the first substrate, the first electrode array comprising a plurality of electrodes having spaces there between, the method comprising:

a) applying a first periodic signal having a frequency and a first phase to a first subset of the first electrode array and a second periodic signal having the frequency and a second phase, opposite to the first phase, to a second subset of the first electrode array, thereby establishing a non-uniform electric field having constant magnitude over at least one imaginary closed surface located entirely in the fluid, whereby only the particle of one type are attracted by dielectrophoresis toward portions of the region enclosed by the at least one imaginary closed surface; and b) sensing the number of particles in each of the portions.

28. A method according to claim 24, for counting the number of particles immersed in a fluid further comprising the step of:

separately summing the number of particles of a same type.

29. A method according to claim 24, for counting the number of particles of at least one type immersed in a fluid, further comprising the steps of:

before the step of sensing the type of each particle trapped in the portions, sequentially displacing the imaginary closed surfaces toward at least one sensing location by sequentially changing the composition of the first subset of the group of electrodes or the at least one other subset of the group of electrodes, or both the first subset of the group of electrodes and the at least one other subset of the group of electrodes, in order to move trapped particles toward the sensing location; and separately summing the number of particles of a same type.

30. A method according to claim 24, where the step of sensing comprises measuring variations in characteristics selected between electrical arid optical in at least one portion of the fluid.

* * * * *